US012380712B2

(12) United States Patent
Long et al.

(10) Patent No.: US 12,380,712 B2
(45) Date of Patent: Aug. 5, 2025

(54) UNIFIED SCENE TEXT DETECTION AND LAYOUT ANALYSIS

(71) Applicant: Google LLC, Mountain View, CA (US)

(72) Inventors: Shangbang Long, Sunnyvale, CA (US); Siyang Qin, Danville, CA (US); Dmitry Panteleev, Princeton, NJ (US); Alessandro Bissacco, Los Angeles, CA (US); Yasuhisa Fujii, Sunnyvale, CA (US); Michail Raptis, Venice, CA (US)

(73) Assignee: Google LLC, Mountain View, CA (US)

( * ) Notice: Subject to any disclaimer, the term of this patent is extended or adjusted under 35 U.S.C. 154(b) by 323 days.

(21) Appl. No.: 17/901,617

(22) Filed: Sep. 1, 2022

(65) Prior Publication Data

US 2024/0062560 A1    Feb. 22, 2024

Related U.S. Application Data

(63) Continuation of application No. PCT/GR2022/000042, filed on Aug. 18, 2022.

(51) Int. Cl.
*G06V 20/62* (2022.01)
*G06V 10/82* (2022.01)
(Continued)

(52) U.S. Cl.
CPC ............. *G06V 20/63* (2022.01); *G06V 10/82* (2022.01); *G06V 30/1448* (2022.01); *G06V 30/414* (2022.01)

(58) Field of Classification Search
CPC ...... G06V 20/63; G06V 10/82; G06V 30/414; G06V 30/1448
See application file for complete search history.

(56) References Cited

U.S. PATENT DOCUMENTS 7,570,816 B2    8/2009   Bargeron et al.
10,706,322 B1 *  7/2020   Yang ...................... G06V 10/82
(Continued)

FOREIGN PATENT DOCUMENTS

EP          2080113       9/2018
WO    WO 2019090506       5/2019
WO    WO 2022076019       4/2022

OTHER PUBLICATIONS

Antonacopoulos et al., "A realistic dataset for performance evaluation of document layout analysis," In 2009 10th International Conference on Document Analysis and Recognition, Jul. 26, 2009, 5 pages.
(Continued)

*Primary Examiner* — David Perlman
(74) *Attorney, Agent, or Firm* — Fish & Richardson P.C.

(57) ABSTRACT

Methods, systems, and apparatus, including computer programs encoded on a computer storage medium, for jointly performing text detection and layout analysis. In one aspect, a method comprises processing the image and a set of object queries to generate an encoded representation of the image and an encoded representation of the set of object queries; processing the encoded representation of the image and the encoded representation of the set of object queries to generate a set of text detection masks; processing the encoded representation of the set of object queries to generate layout relevance measures; processing the encoded representation of the set of object queries to generate textness scores for the text detection masks; generating a text detection output that defines respective areas of the image that include text items; and generating a layout analysis output that defines clusters of respective areas of the image identified by the text detection masks.

20 Claims, 4 Drawing Sheets

(51) Int. Cl.
  *G06V 30/14* (2022.01)
  *G06V 30/414* (2022.01)

(56) References Cited

U.S. PATENT DOCUMENTS

| | | | | |
|---|---|---|---|---|
| 11,971,955 | B1* | 4/2024 | Chakraborty | G06F 3/04845 |
| 2006/0156226 | A1* | 7/2006 | Dejean | G06F 40/258 |
| | | | | 715/251 |
| 2013/0236111 | A1* | 9/2013 | Pintsov | G06V 30/418 |
| | | | | 382/224 |
| 2021/0203679 | A1 | 7/2021 | Burriesci et al. | |
| 2021/0319255 | A1* | 10/2021 | Pham | G06V 10/82 |
| 2023/0081171 | A1* | 3/2023 | Zhang | G06T 11/00 |
| | | | | 382/157 |
| 2023/0186668 | A1* | 6/2023 | Dong | G06F 40/106 |
| | | | | 382/176 |

OTHER PUBLICATIONS

Appalaraju et al., "Docformer: End-to-end transformer for document understanding," In Proceedings of the IEEE/CVF International Conference on Computer Vision, Oct. 10-17, 2021, 11 pages.
Baek et al., "Character region awareness for text detection," In Proceedings of the IEEE/CVF Conference on Computer Vision and Pattern Recognition, Apr. 2019, 10 pages.
Biten et al., "Scene text visual question answering," In Proceedings of the IEEE/CVF international conference on computer vision, Oct. 2019, 11 pages.
Breuel, "Two geometric algorithms for layout analysis," Document Analysis Systems V: 5th International Workshop, DAS 2002 Princeton, NJ, USA, Aug. 19-21, 2002, 12 pages.
Carion et al., "End-to-end object detection with transformers," In Computer Vision-ECCV 2020: 16th European Conference, Glasgow, UK, Aug. 23-28, 2020, 17 pages.
Cattoni et al., "Geometric layout analysis techniques for document image understanding: a review," ITC-irst Technical Report, Jan. 1998, 68 pages.
Ch'ng et al., "Total-text: A comprehensive dataset for scene text detection and recognition," Submitted on Oct. 2017, arXiv:1710.10400v1, 13 pages.
Chen et al., "Deeplab: Semantic image segmentation with deep convolutional nets, atrous convolution, and fully connected CRFs," IEEE transactions on pattern analysis and machine intelligence, Apr. 27, 2017, 14 pages.
Cheng et al., "Focusing attention: Towards accurate text recognition in natural images," In Proceedings of the IEEE International Conference on Computer Vision (ICCV), Oct. 2017, 9 pages.
Chng et al., "ICDAR2019 robust reading challenge on arbitrary-shaped text-rrc-art," In 2019 International Conference on Document Analysis nd Recognition (ICDAR), Sep. 20, 2019, 6 pages.
Clausner et al., "ICDAR2017 competition on recognition of documents with complex layouts-rdc12017," In 2017 14th IAPR International Conference on Document Analysis and Recognition (ICDAR), Nov. 9, 2017, 7 pages.
Clausner et al., "The enp image and ground truth dataset of historical newspapers," In 2015 13th International Conference on Document Analysis and Recognition (ICDAR), Aug. 23, 2015, 5 pages.
Dai et al., "Progressive contour regression for arbitrary-shape scene text detection," In Proceedings of the IEEE/CVF Conference on Computer Vision and Pattern Recognition (CVPR), Jun. 2021, 10 pages.
Everingham et al., "The pascal visual object classes challenge: A retrospective," International journal of computer vision, Jan. 2015, 38 pages.
Haralick et al., "Document image understanding: Geometric and logical layout" In CVPR, vol. 94, Jun. 21, 1994, 6 pages.
He et al., "Mask r-cnn," In Proceedings of the IEEE international conference on computer vision, 2017, 9 pages.
He et al., "Most: A multi-oriented scene text detector with localization refinement," In Proceedings of the IEEE/CVF Conference on Computer Vision and Pattern Recognition, Apr. 2021, 10 pages.
Karatzas et al., "ICDAR 2015 competition on robust reading," In 2015 13th International Conference on Document Analysis and Recognition (ICDAR), Aug. 23, 2015, 5 pages.
Kipf et al., "Semi-supervised classification with graph convolutional networks," In 5th International Conference on Learning Representations, ICLR 2017, Toulon, France, Apr. 24-26, 2017, 14 pages.
Kirillov et al., "Panoptic segmentation," In Proceedings of the IEEE/CVF Conference on Computer Vision and Pattern Recognition, Jun. 15-20, 2019, 10 pages.
Krylov et al., "Open images v5 text annotation and yet another mask text spotter," In Asian Conference on Machine Learning, Nov. 28, 2021, 11 pages.
Kuhn, "The hungarian method for the assignment problem," Naval research logistics quarterly, Mar. 1955, 19 pages.
Kuznetsova et al., "The open images dataset v4," International Journal of Computer Vision, Jul. 2020, 26 pages.
Lee et al., "Page segmentation using a convolutional neural network with trainable co-occurrence features," In 2019 International Conference on Document Analysis and Recognition (ICDAR), Sep. 20, 2019, 6 pages.
Lee et al., "Tedeval: A fair evaluation metric for scene text detectors," In 2019 International Conference on Document Analysis and Recognition Workshops (ICDARW), vol. 7, Sep. 22, 2019, 7 pages.
Li et al., "An end-to-end OCR text re-organization sequence learning for rich-text detail image comprehension," In European Conference on Computer Vision, Aug. 23-28, 2020, 16 pages.
Liao et al., "Mask textspotter v3: Segmentation proposal network for robust scene text spotting," In Computer Vision-ECCV 2020: 16th European Conference, Glasgow, UK, Aug. 23-28, 2020, 20 pages.
Lin et al., "Focal loss for dense object detection," In Proceedings of the IEEE international conference on computer vision, Aug. 2017, 9 pages.
Liu et al., "Detecting curve text in the wild: New dataset and new solution," arXiv:1712.02170v1, Dec. 6, 2017, 9 pages.
Liu et al., "Tightness-aware evaluation protocol for scene text detection," In Proceedings of the IEEE/CVF Conference on Computer Vision and Pattern Recognition, Jun. 15-20, 2019, 9 pages.
Long et al., "Fully convolutional networks for semantic segmentation," In Proceedings of the IEEE conference on computer vision and pattern recognition, 2015, 10 pages.
Long et al., "Scene text detection and recognition: The deep learning era," Submitted on Aug. 2020, arXiv: 1811.04256V5, 26 pages.
Long et al., "Textsnake: A flexible representation for detecting text of arbitrary shapes," In Proceedings of the European conference on computer vision (ECCV), Jul. 2018, 17 pages.
Loshchilov et al., "Decoupled weight decay regularization," In 7th International Conference on Learning Representations, ICLR 2019, New Orleans, LA, USA, May 6-9, 2019, 19 pages.
Lu et al., "Master: Multi-aspect non-local network for scene text recognition," Pattern Recognition, Apr. 11, 2021, 34 pages.
Milletari et al., V-net: Fully convolutional neural networks for volumetric medical image segmentation. In 2016 fourth international conference on 3D vision (3DV), Jun. 15, 2016, 11 pages.
Nayef et al., "ICDAR2017 robust reading challenge on multi-lingual scene text detection and script identification-rrc-mlt," In 2017 14th IAPR International Conference on Document Analysis and Recognition (ICDAR), Nov. 9-15, 2017, 6 pages.
Nayef et al., "ICDAR2019 robust reading challenge on multi-lingual scene text detection and recognition—rrc-lt-2019," In 2019 International Conference on Document Analysis and Recognition (ICDAR), Jul. 1, 2019, 6 pages.
Newell et al., "Stacked hourglass networks for human pose estimation," In Computer Vision-ECCV 2016: 14th European Conference, Amsterdam, The Netherlands, Jul. 26, 2016, 17 pages.
Qin et al., "Towards unconstrained end-to-end text spotting," In Proceedings of the IEEE/CVF International Conference on Computer Vision, Aug. 2019, 11 pages.

(56) References Cited

OTHER PUBLICATIONS

Raisi et al., "Transformer-based text detection in the wild," In Proceedings of the IEEE/CVF Conference on Computer Vision and Pattern Recognition, Jun. 19-25, 2021, 10 pages.

Ren et al., "Faster r-cnn: Towards real-time object detection with region proposal networks," Advances in neural information processing systems, 2015, 9 pages.

Schreiber et al., "DeepDeSRT: Deep learning for detection and structure recognition of tables in document images," In 2017 14th IAPR international conference on document analysis and recognition (ICDAR), Nov. 9, 2017, 6 pages.

Sheng et al., "Centripetaltext: An efficient text instance representation for scene text detection," Advances in Neural Information Processing Systems, Dec. 6, 2021, 12 pages.

Shi et al., "Aster: An attentional scene text recognizer with flexible rectification," IEEE transactions on pattern analysis and machine intelligence, Jun. 25, 2018, 14 pages.

Shi et al., "ICDAR2017 competition on reading chinese text in the wild (rctw-17)," In 2017 14th IAPR International Conference on Document Analysis and Recognition (ICDAR), Sep. 26, 2018, 6 pages.

Singh et al., "TextOCR: Towards largescale end-to-end reasoning for arbitrary-shaped scene text," In Proceedings of the IEEE/CVF Conference on Computer Vision and Pattern Recognition (CVPR), Jun. 2021, 11 pages.

Singh et al., "Towards vqa models that can read," In Proceedings of the IEEE Conference on Computer Vision and Pattern Recognition, Apr. 18, 2019, 10 pages.

Sun et al., "ICDAR 2019 competition on large-scale street view text with partial labeling-rrc-lsvt," In 2019 International Conference on Document Analysis and Recognition (ICDAR), Sep. 17, 2019, 6 pages.

Tang et al., "Seglink++: Detecting dense and arbitrary-shaped scene text by instance-aware component grouping," Pattern recognition, Dec. 2019, 35 pages.

Vaswani et al., "Attention is all you need" Submitted on Dec. 2017, arXiv:1706.03762V5, 15 pages.

Vatti, "A generic solution to polygon clipping," Communications of the ACM, Jul. 1, 1992, 8 pages.

Wang et al., "Max-deeplab: End-to-end panoptic segmentation with mask transformers," In Proceedings of the IEEE/CVF Conference on Computer Vision and Pattern Recognition, Jun. 20-25, 2021, 12 pages.

Wang et al., "Post-ocr paragraph recognition by graph convolutional networks," In Proceedings of the IEEE/CVF Winter Conference on Applications of Computer Vision, Jan. 3-8, 2022, 10 pages.

Wang et al., "Shape robust text detection with progressive scale expansion network," In Proceedings of the IEEE/CVF Conference on Computer Vision and Pattern Recognition, Jun. 16-20, 2019, 10 pages.

Weber et al., "Deeplab2: A tensorflow library for deep labeling," Submitted on Jun. 17, 2021, arXiv preprint arXiv:2106.09748, 7 pages.

Xu et al., "Towards accurate text-based image captioning with content diversity exploration," In Proceedings of the IEEE/CVF Conference on Computer Vision and Pattern Recognition, Jun. 20-25, 2021, 10 pages.

Yang et al., "Learning to extract semantic structure from documents using multimodal fully convolutional neural networks," In Proceedings of the IEEE Conference on Computer Vision and Pattern Recognition, Jul. 21-26, 2017, 10 pages.

Yao et al., "Detecting texts of arbitrary orientations in natural images," In 2012 IEEE conference on computer vision and pattern recognition, Jun. 16, 2012, 8 pages.

Zhang et al., "Adaptive boundary proposal network for arbitrary shape text detection," In Proceedings of the IEEE/CVF International Conference on Computer Vision (ICCV), Oct. 2021, 10 pages.

Zhong et al., "Publaynet: largest dataset ever for document layout analysis," In 2019 International Conference on Document Analysis and Recognition (ICDAR), Sep. 20-25, 2019, 2019, 8 pages.

Zhou et al., "East: an efficient and accurate scene text detector," In Proceedings of the IEEE conference on Computer Vision and Pattern Recognition, Jul. 2017, 10 pages.

Zhu et al., "Fourier contour embedding for arbitrary-shaped text detection," In Proceedings of the IEEE/CVF Conference on Computer Vision and Pattern Recognition (CVPR), Jun. 2021, 9 pages.

\* cited by examiner

UNIFIED SCENE TEXT DETECTION AND LAYOUT ANALYSIS

CROSS-REFERENCE TO RELATED APPLICATION

This application claims the benefit under 35 U.S.C. § 120 as a continuation of International Patent Application No. PCT/GR2022/000042, filed on Aug. 18, 2022, which is incorporated by reference herein in its entirety.

BACKGROUND

This description relates to machine learning techniques for understanding text.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Understanding text information in unconstrained environments may include scene text detection. For example, text may appear in a variety of places such as guide posts, product names, street numbers, etc., and such text may convey useful information about the environment. Scene text detection tries to identify individual words within areas in the scene such as street sides that are most likely to contain text.

Understanding text information in digital documents and other printed materials, such as a business letter or single column report, may include document layout analysis. Document layout analysis tries to extract the contents of a document and restore its structure by analyzing the spatial arrangement of the contents.

Document layout analysis and scene text detection have long been treated as two separate tasks in different image domains. Despite the abundance of successful scene text detection and document layout analysis algorithms, the task of unified text detection and layout analysis largely remains untouched.

SUMMARY

This specification describes a system implemented as computer programs on one or more computers in one or more locations that trains, implements, or both a unified detector neural network that is configured to jointly perform text detection and layout analysis in images.

As used herein, the term "image" is used in the broadest sense, referring to any image data or digital data that defines an image. Images may, for example, be two dimensional, three dimensional, or in the form of a video. Images may be captured by a scanner, a camera, a specially-adapted sensor array (such as CCD array), a microscope, a smartphone camera, a video camera, an x-ray machine, a sonar, an ultrasound machine, a microphone (or other instruments for converting sound waves into electrical energy variations), etc.

The subject matter described in this specification can be implemented in particular embodiments so as to realize one or more of the following advantages.

A unified detector neural network, as described in this specification, is a single machine learning model that can simultaneously perform scene text detection and geometric layout analysis in a unified way. The described unified detector neural network applies an attention mechanism across pixels in an input image and a set of learned object queries to allow bidirectional information flow to generate encoded queries and pixel features. This information is then subsequently used to generate masks for text detection and generate an affinity matrix to cluster text lines, both in an end-to-end manner without complex post-processing.

This single-stage simplified pipeline allows the neural network to jointly perform scene text detection and geometric layout analysis tasks without significant increases in processing time needed for or computing resources used by the neural network, either during training or, after training, at run time. On each individual task, the described unified detector neural network achieves or even exceeds state-of-the-art performance than standalone models. i.e., models that are only configured to perform either text detection or layout analysis tasks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
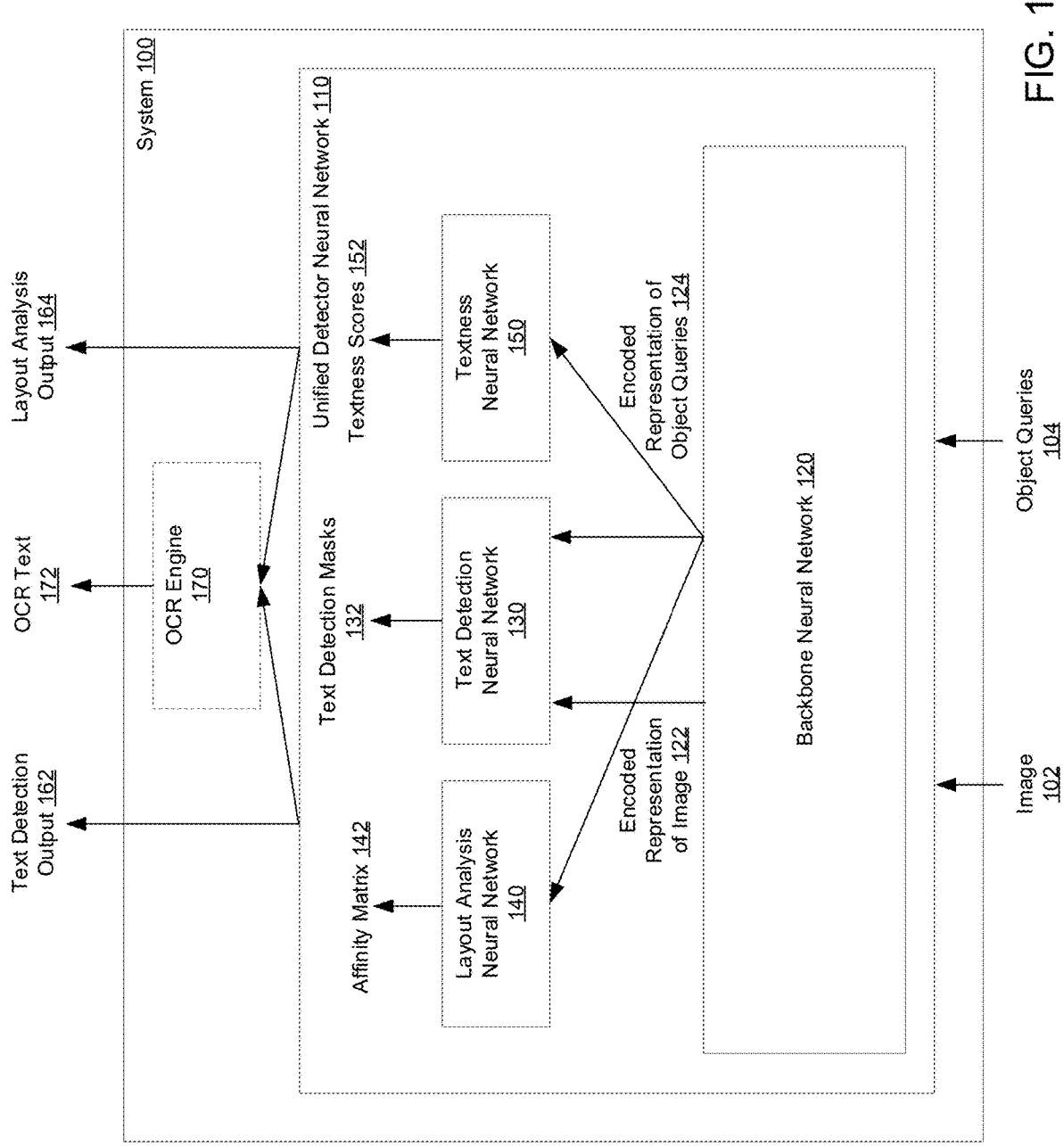
FIG. 1 shows an example system.

FIG. 1 shows an example system 100. The system 100 is an example of a system implemented as computer programs on one or more computers in one or more locations, in which the systems, components, and techniques described below can be implemented.

The system 100 includes a unified detector neural network 110, which is configured to process an image 102 and a set of object queries 104 to generate a text detection output 162 and a layout analysis output 164.

The image 102 can be any image that includes a text. For example, the image may be a digital document having typed text or free hand drawings, or may alternatively be a scan of some printed materials having typed text or free hand drawings. As another example, the image may characterize a scene in an unconstrained environment within which a text appears. For example, the image may depict an object having a text thereon. In addition, the system 100 can receive the image 102 in any of a variety of ways. For example, the system 100 can receive the image 102 as an upload from a user device communicatively coupled to the system over a data communication network. As another example, the system 100 can receive an input from a user specifying, e.g., using an application programming interface (API) made available by the system 100, which data that is already maintained by the system 100 should be used as the image 102.

The set of object queries 104, which includes a fixed number of object queries, with each object query made up of multiple variables having learned values, is provided by the system 100, in addition to the image 102, to the unified detector neural network 110 to assist the network in generating the text detection output 162 and the layout analysis output 164 from the image 102. That is, the unified detector neural network 110 is configured to generate the text detection output 162 and the layout analysis output 164 conditioned on the set of object queries 104. As used herein, the term "learned" means that an operation or a value has been adjusted during the training of the unified detector neural network 110. In some implementations, the same set of object queries 104 is shared across different images while in other implementations, the system can provide different object queries, e.g., that have a smaller or larger number of variables, together with different images to the unified detector neural network 110.

As used herein, the term "text detection" refers to identifying a portion of an image that includes an individual text item, while the term "layout analysis" refers to identifying a portion of an image that includes a group of multiple contiguous text items. A group of text items can include text items that are within a threshold distance of other text items within the group and/or text items that are located within visible edges or borders within the image. For example, a group of text items may include text items that are within a visible block (e.g., a square, rectangle, or other appropriate shape with visible borders) depicted in the image or that is to one side of a dividing line depicted in the image.

For example, text detection may refer to identifying a portion of an image that includes a word (or a string of characters), and layout analysis may refer to identifying a portion of an image that includes a sentence, a clause, or another multi-word phrase. As another example, text detection may refer to identifying a portion of an image that includes a text line, or that similarly includes a word, and layout analysis may refer to identifying a portion of an image that includes a paragraph, a block, or some other multi-line text.

Figure 2:
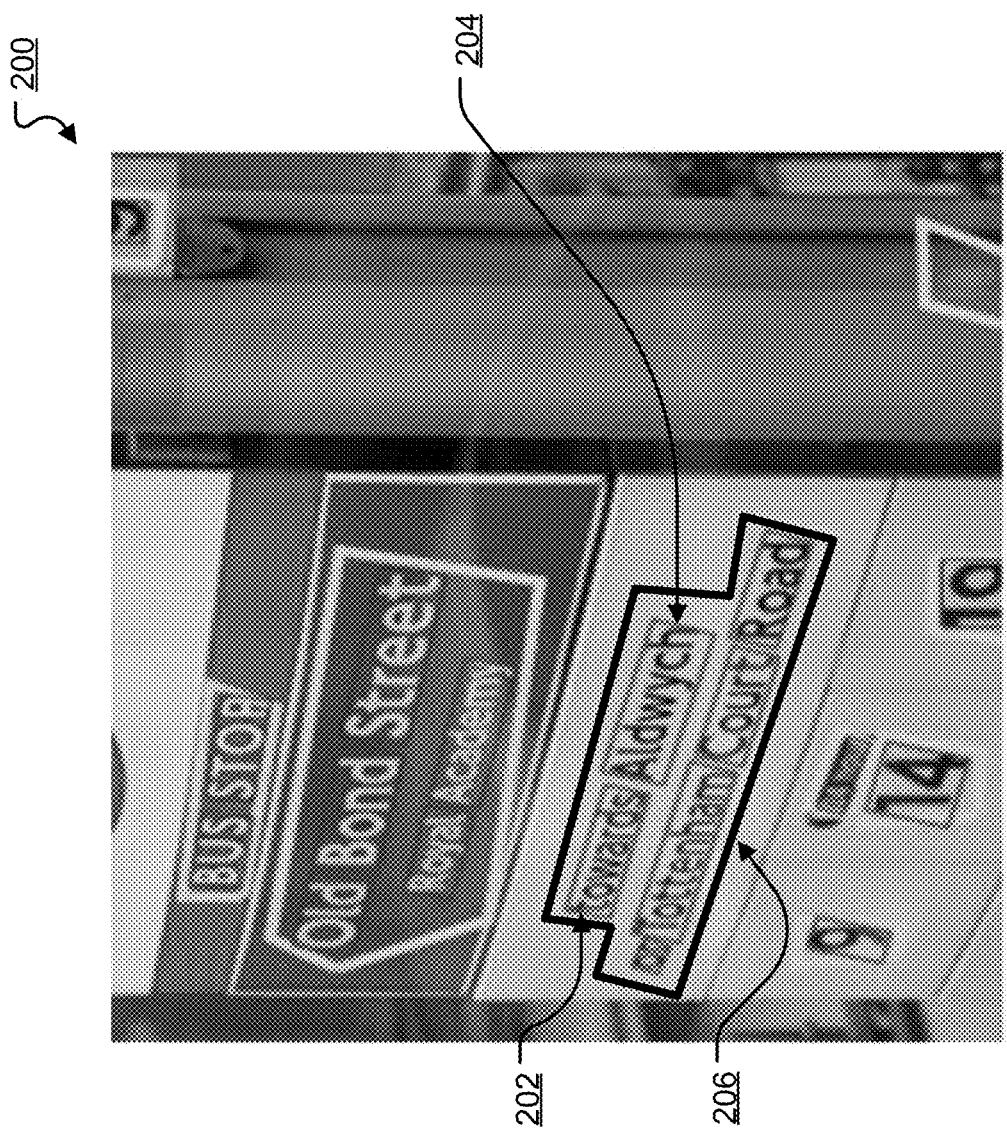
FIG. 2 is an illustration of an example text detection output and an example layout analysis output.

FIG. 2 is an illustration of an example text detection output and an example layout analysis output that can be generated by using the unified detector neural network 110 with reference to an image 200. As illustrated, the text detection output can include data defining one or more first bounding boxes, e.g., bounding box 202 and 204, in the image 200, where each first bounding box includes a word. The layout analysis output can include data defining one or more second bounding boxes, e.g., bounding box 206, in the image 200, where each second bounding box includes a multi-word phrase.

It will be appreciated that, although the exact definitions of the individual text item, the group of multiple contiguous text items, or both may vary from case to case, these definitions are generally ordered in a hierarchy where the grouping of multiple contiguous text items has a genus definition that encompasses the individual text item. For example, layout analysis may refer to identifying related text items based on the arrangement of the text items within in the image. For example, the unified detector neural network 110 can identify, as related text items, text items that are grouped together and/or that has the same (or similar) visual characteristics, such as the same font type, size, and/or color.

The unified detector neural network 110 is implemented with a neural network architecture that enables it to perform unified text detection and layout analysis in an end-to-end manner. As illustrated in FIG. 1, the unified detector neural network 110 includes a backbone neural network 120, a text detection neural network 130, a layout analysis neural network 140, and a textness neural network 150, which collectively define the unified detector neural network 110. The backbone neural network 120, the text detection neural network 130, the layout analysis neural network 140, and the textness neural network 150 each include a different subset of the multiple neural network layers in the unified detector neural network 110.

The backbone neural network 120 can include an alternating stack of convolutional layers and attention layers, i.e., can include multiple convolutional layers separated by one or more attention layers, that are configured to process a backbone network input to generate a backbone network output by passing data successively between them in a certain layer order. As used herein an attention layer is a neural network layer that includes an attention mechanism, e.g., a multi-head self-attention mechanism. Examples of configurations the backbone neural network 120 are described in more detail in Carton, Nicolas, et al. "End-to-end object detection with transformers." European conference on computer vision. Springer, Cham, 2020, and Wang, Huiyu, et al. "Max-deeplab: End-to-end panoptic segmentation with mask transformers." Proceedings of the IEEE/CVF conference on computer vision and pattern recognition. 2021, the entire contents of which are hereby incorporated by reference herein in their entirety.

The backbone network input includes the image 102 and the set of object queries 104, data derived from the image 102 and the set of object queries 104, or both. The backbone network output, which can be generated by the backbone neural network 120 from processing the backbone network input in accordance with parameter values of the backbone neural network, includes an encoded representation of the image 122 and an encoded representation of the set of object queries 124. Generally, an encoded representation is a vector or other ordered collection of numeric values.

The text detection neural network 130 can include a first stack of one or more convolutional layers and a second stack of one or more fully connected layers. The two stacks of layers can be arranged in parallel with each other, where the first stack of convolutional layers is configured to receive as input the encoded representation of the image 122, and the second stack of fully connected layers is configured to receive as input the encoded representation of the set of object queries 124. The text detection network 130 is configured to process the encoded representation of the image 122 and the set of object queries 124 in accordance with parameter values of the text detection neural network to generate a text detection network output 132 that includes a set of text detection masks. A text detection mask as used herein refers to a digital representation of certain area of an image that has been determined as likely can contain a text item.

The exact number of text detection masks in the set can be dependent on the set of object queries 104 received by the unified detector neural network 110. In some implementations, the text detection neural network 130 is configured to generate the same number of text detection masks as the total number of object queries included in the set of object queries 104.

In some implementations, the set of text detection masks can have a same fixed dimension, where each text detection mask in the set can be a respective "softly exclusive" mask, namely a mask including softmax scores generated by using a softmax function, that assigns each of some or all of the pixels in the image to be either a text pixel (that is part of an area that contains a text item), i.e., by assigning to the pixel a softmax score that is above a text threshold score, or a background pixel (that is not part of any area that contains a text item), i.e., by assigning to the pixel a softmax score that is below the text threshold score.

The layout analysis neural network 140 can be an attention neural network, i.e., can include one or more attention layers, that is configured to receive as input the encoded representation of the set of object queries 124 and to process the encoded representation of the set of object queries 124 in accordance with parameter values of the layout analysis network to generate a layout analysis network output 142 that specifies a measure of relevance between the pair of text items represented by each unique combination of two text detection masks in the set of text detection masks.

In some implementations, the layout analysis network output 142 can include data that defines an affinity matrix where each entry indicates a pairwise relevance measure between the two text detection masks that correspond respectively to the horizontal and vertical dimensions of the entry. In these implementations, each relevance measure may range between zero to one, with zero indicating no relevance and one indicating a high relevance.

The textness neural network 150 can be a fully connected neural network, i.e., can include one or more fully connected layers and an activation layer, that is configured to receive as input the encoded representation of the set of object queries 124 and to process the encoded representation of the set of object queries 124 in accordance with parameter values of the textness neural network to generate a textness network output 152 that specifies a respective textness score for each text detection mask included in the text detection network output 132. The textness score represents, for each text detection mask included in the text detection network output 132, a respective likelihood as determined by the textness neural network 150 that a text is actually present in the area of the image represented by the text detection mask.

In some implementations, the activation layer can be a softmax layer, which applies a softmax function over the layer output of the last fully connected layer in the stack of one or more fully connected layers to generate the respective textness scores.

The unified detector neural network 110 is then configured to use the text detection network output 132, the layout analysis sub-network output 142, and the textness network output 152 to generate the text detection output 162 and the layout analysis output 164, as will be described further below with reference to FIG. 3.

In some implementations, the text detection output 162 and the layout analysis output 164 can be provided as final outputs of the system 100, while in other implementations, the outputs 162 and 164 can be provided to other components of the system 100 for further processing.

For example, the other system components can include an optical character recognition (OCR) engine 170 that implements a text recognition algorithm to recognize texts depicted in images. In this example, the text detection output 162, the layout analysis output 164, or both can then be provided for processing by the OCR engine, i.e., in addition to the image 102, to obtain OCR text 172 in the image 102.

Moreover, the other system components can further include an information retrieval engine, a text extraction engine, or any other electronic document processing engine that can be used to process the obtained OCR text 172. An example of such electronic document processing engine is a machine language translation engine, which can be configured to translate the obtained OCR text from a source language to a different target language. Once generated, the final outputs of the system 100, which include the text detection output 162, the layout analysis output 164, and, in some implementations, the OCR text 172 (or data derived from the OCR text), can be utilized in various ways. For example, the final outputs can be stored at a local memory of the system 100, and/or transmitted to another computing device. For example, the system 100 can output the final outputs to the user who submitted the image 102.

Figure 3:
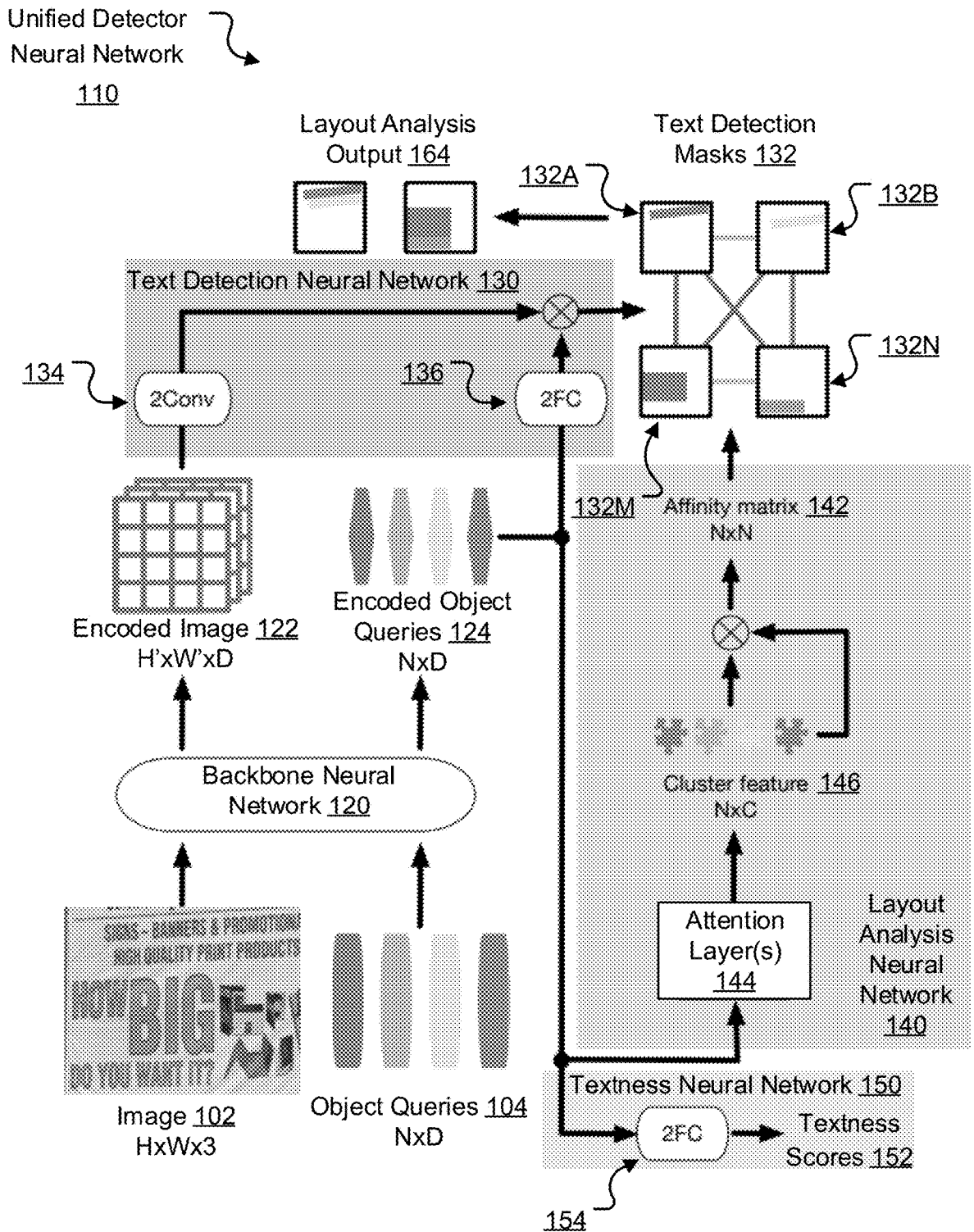
FIG. 3 is an illustration of example operations performed by a unified detector neural network.

FIG. 3 is an illustration of example operations performed by the unified detector neural network 110 for a given image 102 and a given set of object queries 104. For example, the image 102 may be provided by a user of the system, or obtained by the system from another source, while the set of object queries 104 may be pre-stored at the system (or some other remote computing systems).

The backbone neural network 120 processes a backbone network input that includes the image 102 and the set of object queries 104, data derived from the image 102 and the set of object queries 104, or both to generate a backbone network output. For example, the image 102 can be represented by a tensor of dimension H×W×3, and the set of object queries 104 can be represented by a tensor of dimension N×D, where N represents the number of object queries and D represents the dimension (length) of each object query. For example, H=W=1024, N=384, and D=256, although they may have any other positive integer values.

In particular, the backbone neural network 120 generates the backbone network output by applying a sequence of convolution operations to the image 102 to generate a sequence of convolutional features of the image, and then applying an attention mechanism, e.g., a self-attention mechanism, over the sequence of convolutional features of the image and the set of object queries to generate an output of the attention layer. The use of attention mechanism enables bidirectional information flow among pixel space and object queries. This makes it possible to encode long-range information in pixel features derived from the image, and allows object queries to locate and retrieve text items exclusively from pixels of the image. The output of the attention layer is then provided for the subsequent components of the backbone neural network 120, e.g., one or more similar stacks of one or more convolutional layers and an attention layer, for further processing to finally generate the backbone network output.

The backbone network output includes an encoded representation of the image 122 and an encoded representation of the set of object queries 124. For example, the encoded representation of the image 122 can be represented by a tensor of dimension H'×W'×D, and the encoded representation of set of object queries 124 can be represented by a tensor of dimension N×D. For example, H' and W' can be a fraction, e.g., a half or a quarter, of the values of H and W.

The text detection neural network 130 processes the encoded representation of the image 122 using a first stack of convolutional layers 134 to generate a sequence of convolutional features of the encoded representation of the image 134, and processes the encoded representation of the set of object queries 124 using a second stack of fully connected layers 136 to generate a sequence of fully connected features of the encoded representation of the set of object queries 136. Each sequence generally includes a fixed number of numeric values arranged in a sequence order. In the example of FIG. 3, both the first and second stacks have two layers, although in other examples, fewer or greater number of layers of different types may be used.

The two sequences 134 and 136 are then used to generate the set of text detection masks 132. To generate a text detection mask, the numeric values at the corresponding positions in the two sequences 134 and 136 are combined, e.g., multiplied together as an inner product, and then processed using a softmax function to generate the softmax scores to be included in the text detection mask. In some implementations, the text detection neural network 130 is configured to generate the same number of text detection masks as the total number of object queries included in the set of object queries 104, where each text detection mask has the same height and width dimensions as the encoded representation of the image. In these implementations where the text detection mask has smaller dimensions (i.e., lower resolutions) than the input image, each text detection mask can assign a same softmax score to multiple different pixels in the image.

The layout analysis neural network 140 processes the encoded representation of the set of object queries 124 to generate an affinity matrix 142 of dimension N×N, i.e., that includes a total of N×N entries, where each entry of the affinity matrix indicates a pairwise relevance measure between the two text detection masks that correspond respectively to the horizontal and vertical dimensions of the entry. For example, each relevance measure may range between zero to one, with zero indicating no relevance and one indicating a high relevance.

In particular, the layout analysis neural network 140 applies an attention mechanism, e.g., a multi-head self-attention mechanism, over the encoded representation of the set of object queries 124 to generate a set of cluster features. For example, the set of cluster features can be represented by a tensor of dimension N×C, where N represents the number of cluster features and C represents the dimension (length) of each cluster feature. Here C can have a same or different value as D. For example, C=128. To compute each entry of the affinity matrix, the layout analysis neural network 140 applies a sigmoid function (optionally with a temperature value T) to the inner product of two cluster features having ordinal numbers in the set cluster features that correspond respectively to the horizontal and vertical dimensions of the entry in the affinity matrix.

The textness neural network 150 processes the encoded representation of the set of object queries 124 using a stack of one or more fully connected layers to generate a respective textness score 152 for each text detection mask in the set of text detection masks 132. The textness score represents, for each text detection mask, a respective likelihood (or confidence) as determined by the textness neural network 150 that a text is actually present in the area of the image represented by the text detection mask. To generate the textness scores, the textness neural network 150 applies a non-linear activation function to the layer output of the last fully connected layer in the stack of one or more fully connected layers. For example, the activation function is a sigmoid activation function.

The backbone neural network 120 uses the set of text detection masks 132, the affinity matrix 142, and the textness scores 152 to generate the text detection output 162 and the layout analysis output 164.

Specifically, the backbone neural network 120 selects, based on respective textness scores 152 and from the set of text detection masks 132, a proper subset of the set of text detection masks 132. This proper subset of text detection masks 132 is then used to generate the text detection output 162, as described below. Each selected text detection mask in the proper subset of text detection mask identifies a respective area of the image that is determined to include a text item. For example, one or more text detection masks that have highest textness scores, and that assign at least a threshold number of pixels to softmax scores that are above the text threshold score, can be selected. As another example, one or more text detection masks that have at least a threshold textness score, and that assign at least a threshold number of pixels to softmax scores that are above the text threshold score, can be selected. In either example, although a large number of text detection masks identifying respective areas of the image that can include text items have been generated, only a small number of them may actually be selected to be used to generate the text detection output during the processing of any given image, i.e., only a small number of respective areas of the image may be determined as most likely to actually include a text item.

The backbone neural network 120 then generates the text detection output 162 which identifies the respective areas of the image corresponding to the selected text detection masks in the proper subset. In some implementations, the entire area of the image represented by each selected text detection mask is identified in the text detection output 162, while in other implementations, only a part of the area of the image represented by each selected text detection mask is identified, for example pixels having softmax scores below a confidence threshold score (which may have a higher value than the text threshold score) may be discarded from the mask. In some implementations, the text detection output 162 can include data defining one bounding box or another location identifier for each identified area of the image.

The backbone neural network 120 performs a clustering operation to group into one or more clusters those selected text detection masks that are relevant to each other according to the computed affinity matrix. Each pair of text detection masks in the cluster has a pairwise relevance measure that is above a threshold measure. In some implementations, any known union-find algorithm or the like can be utilized to perform the clustering operation. A union-find algorithm is an algorithm performs two useful operations: "find" and "union." Find determines which cluster a particular text detection mask is in. Find operation typically returns a text detection mask from the cluster that serves as the cluster's "representative." By comparing the result of two find operations, the presence of two text detection masks in the same cluster can be determined. Union operation joins two clusters into a single cluster. Merging two clusters into a single cluster is a union operation.

The backbone neural network 120 then generates the layout detection output 164 which defines clusters of respective areas of the image identified by the text detection masks in the proper subset of text detection masks. In some implementations, the layout detection output 164 can include data defining one bounding box or another location identifier for each cluster of one or more identified areas of the image. In the example of FIG. 3, the layout detection output 164 defines two clusters, one for a first cluster of the areas of the image identified by text detection masks 132A and 132B, and another one for a second cluster of the areas of the image identified by text detection masks 132M and 132N. In each cluster, the text detection masks included therein, e.g., text detection masks 132A and 132B, have a pairwise relevance measure that is above a threshold measure.

Figure 4:
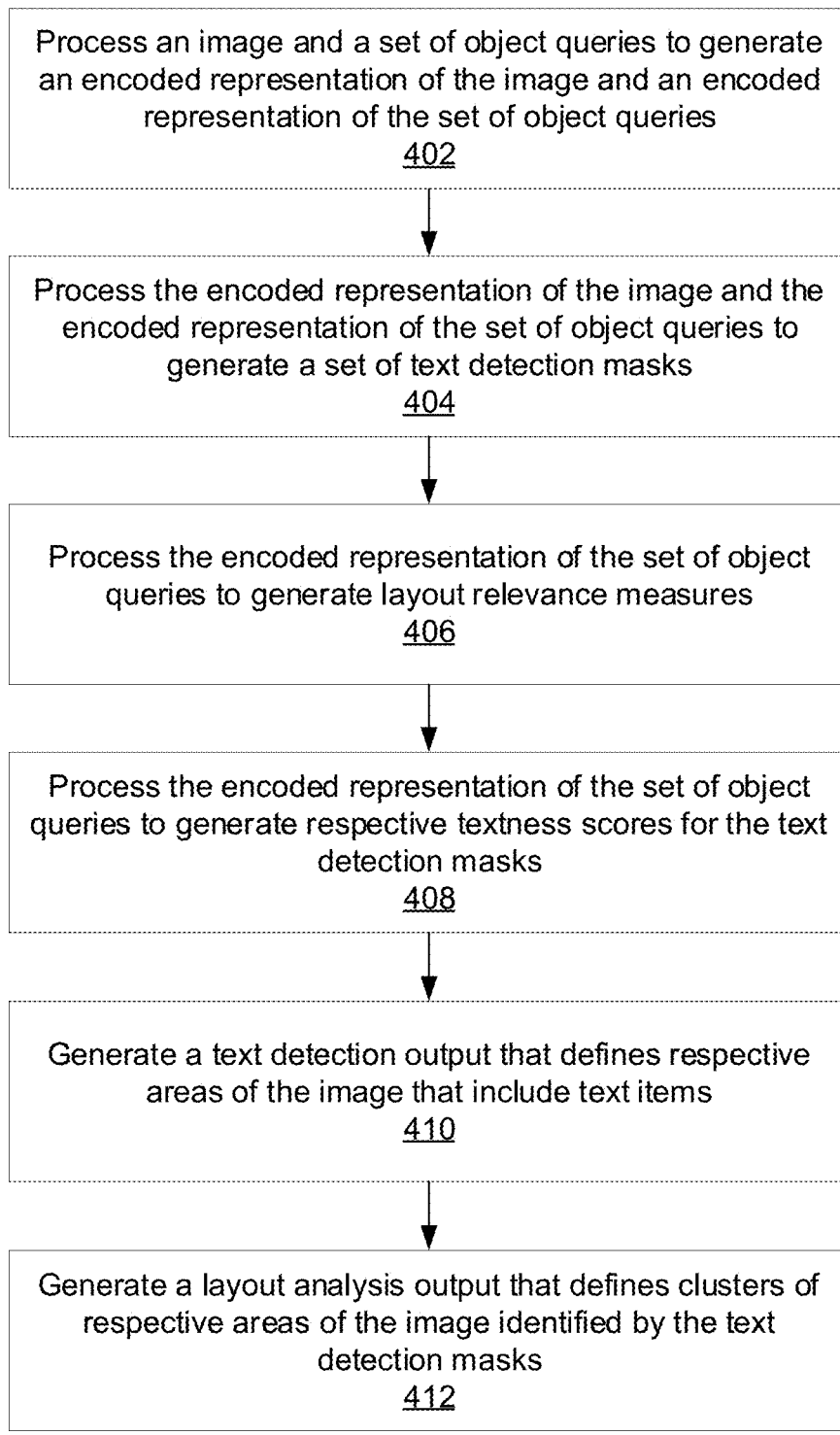
FIG. 4 is a flow diagram of an example process for jointly performing text detection and layout analysis.

FIG. 4 is a flow diagram of an example process 400 for jointly performing text detection and layout analysis. For convenience, the process 400 will be described as being performed by a system of one or more computers located in one or more locations. For example, a system, e.g., the system 100 of FIG. 1, appropriately programmed in accordance with this specification, can perform the process 400.

The system implements a unified detector neural network that includes a backbone neural network, a text detection neural network, a layout analysis neural network, and a textness neural network, which collectively define the unified detector neural network.

The system processes a unified detector network input that includes an image and a set of object queries using the backbone neural network according to current parameter values of the backbone neural network to generate a unified detector network output that includes an encoded representation of the image and an encoded representation of the set of object queries (402). For example, the image may be provided by a user of the system, or obtained by the system from another source, while the set of object queries may be pre-stored at the system (or some other remote computing systems).

The system processes a text detection network input that includes the encoded representation of the image and the encoded representation of the set of object queries using the text detection neural network according to current parameter values of the text detection neural network to generate a text detection network output that includes a set of text detection masks (404). In some implementations, each text detection mask is a softly exclusive mask that identifies a respective area of the image that likely can include a text item. In some implementations, the text detection neural network is configured to generate the same number of text detection masks as the total number of object queries included in the set of object queries.

The system processes the encoded representation of the set of object queries using the layout analysis neural network according to current parameter values of the layout analysis neural network to generate a layout analysis network output that specifies one or more layout relevance measures (406). Each layout relevance measure is for a unique combination of two text detection masks in the set of text detection masks that specifies, for the two detection masks, a measure of relevance between any text items identified by the two text detection masks. In some implementations, the layout analysis network output can include data that defines an affinity matrix where each entry indicates a pairwise relevance measure between the two text detection masks that correspond respectively to the horizontal and vertical dimensions of the entry.

The system processes a textness network input that includes the encoded representation of the set of object queries using the textness neural network according to current parameter values of the textness neural network to generate a textness network output that specifies the respective textness scores for the text detection masks (408). Each respective textness score represents a likelihood (or confidence) as determined by the textness neural network that a text item is actually present in the respective area of the image identified by a corresponding text detection mask.

The system generates a text detection output that defines respective areas of the image that are determined to include text items (410). The text detection output is derived from a selection of a proper subset of the set of text detection masks. Specifically, the system selects, based on respective textness scores generated by the textness neural network, a proper subset of the set of text detection masks, where each selected text detection mask in the proper subset identifies a respective area of the image that is determined to include a text item. The system then generates the text detection output that identifies the respective areas of the image corresponding to the selected text detection masks in the proper subset. For example, one or more text detection masks that have highest textness scores can be selected. As another example, one or more text detection masks that have at least a threshold textness score can be selected.

The system generates, from the proper subset of text detection masks and the layout relevance measures, a layout analysis output that defines clusters of respective areas of the image identified by the text detection masks in the proper subset of text detection masks (412). To generate the layout analysis output, the system performs a clustering operation to group into one or more clusters those selected text detection masks that are relevant to each other according to the layout relevance measures specified in the layout analysis network output. Each cluster can includes a group of one or more text items. Each pair of text detection masks in the cluster can have a pairwise relevance measure that is above a threshold measure.

In general, the process 400 can be performed as part of predicting a text detection output and a layout analysis output for a unified detector network input for which the desired outputs, i.e., the text detection output and the layout analysis output that should be generated by the system for the unified detector network input, is not known.

The process 400 can also be performed as part of processing unified detector network inputs derived from a set of training data, i.e., inputs derived from a set of inputs for which the text detection output and the layout analysis output that should be generated by the system are known, in order to train the unified detector neural network to determine trained values for the parameters of the unified detector neural network, as well as to determine the trained values of the set of object queries. The system can repeatedly perform the process 400 on inputs selected from a set of training data as part of a conventional machine learning training technique, e.g., a gradient descent with backpropagation training technique that uses a conventional optimizer, e.g., stochastic gradient descent, RMSprop, or Adam optimizer, including Adam with weight decay ("AdamW") optimizer, and in an end-to-end manner, to train the neural network layers within the unified detector neural network and, by virtue of the backpropagation, to update the values of the set of object queries to optimize an objective function that is appropriate for the text detection task and the layout analysis task that the unified detector neural network is configured to perform.

During training, the system can incorporate any number of techniques to improve the speed, the effectiveness, or both of the training process. For example, the system can perform the training using a distributed architecture that trains multiple instances of the unified detector neural network in parallel. As another example, in addition to having a text detection loss term and a layout analysis loss term, the objective function that is used to train the unified detector neural network can also include a semantic segmentation loss term and an instance discrimination loss term. This may help train the network faster by providing additional training signals. As another example, to alleviate the issue that the network outputs are unordered, i.e., that specifies an unordered set of respective areas of the image that include text items, an unordered set of clusters of respective areas of the image identified by the text detection masks, or both, the training process can make use of a bipartite matching between training network outputs and ground truth outputs. The bipartite matching involves determining a set of optimal assignments between the training network outputs and the ground truth outputs that maximizes a score determined by evaluating a function that includes a recognition quality term and a segmentation quality term. Both candidate additional loss terms and bipartite matching are described in more detail in "Max-deeplab: End-to-end panoptic segmentation with mask transformers." Proceedings of the IEEE/CVF conference on computer vision and pattern recognition, 2021.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating a set of text detection masks for an image, wherein each text detection mask identifies a respective area of the image that likely includes a text item;
   generating one or more layout relevance measures for the image, wherein each layout relevance measure is for a unique combination of two text detection masks in the set of text detection masks and specifies, for the two detection masks, a measure of relevance between text items identified by the two text detection masks;
   generating respective textness scores for the text detection masks, wherein each respective textness score represents a likelihood that a text item is present in the respective area of the image identified by a corresponding text detection mask;
   generating a text detection output that defines respective areas of the image that are determined to include text items, the text detection output being a selection of a proper subset of the set of text detection masks based on the respective textness scores; and
   generating, from the proper subset of the set of text detection masks and the one or more layout relevance measures, a layout analysis output that defines clusters of respective areas of the image identified by the text detection masks in the proper subset of the set of text detection masks.

2. The method of claim 1, wherein:
   generating the set of text detection masks for the image comprises:
      processing the image and a set of object queries using a backbone neural network according to current parameter values of the backbone neural network to generate an encoded representation of the image and an encoded representation of the set of object queries; and
      processing the encoded representation of the image and the encoded representation of the set of object queries using a text detection neural network according to current parameter values of the text detection neural network to generate the set of text detection masks, wherein each text detection mask identifies a respective area of the image that likely includes a text item;

generating the one or more layout relevance measures for the image comprises:
processing the encoded representation of the set of object queries using a layout analysis neural network according to current parameter values of the layout analysis neural network to generate the one or more layout relevance measures;

generating the respective textness scores for the text detection masks comprises:
processing the encoded representation of the set of object queries using a textness neural network according to current parameter values of the textness neural network to generate the respective textness scores for the text detection masks; and the backbone neural network, the text detection neural network, the layout analysis neural network, and the textness neural network define a unified detector neural network.

3. The method of claim 1, wherein selecting the proper subset of the set of text detection masks comprises:
selecting, from the set of text detection masks, one or more text detection masks that have highest textness scores.

4. The method of claim 1, wherein selecting the proper subset of the set of text detection masks comprises:
selecting, from the set of text detection masks, one or more text detection masks that have at least a threshold textness score.

5. The method of claim 1, wherein generating the layout detection output comprises:
generating one or more clusters of the text items included in the respective areas of the image identified by the text detection masks in the proper subset of text detection masks, wherein each cluster includes a group of text items, each pair of text items in the group having a pairwise measure of relevance that is above a threshold measure.

6. The method of claim 2, wherein the backbone neural network comprises one or more convolutional layers and an attention layer, the one or more convolutional layers configured to process the image to generate a sequence of convolutional features of the image, and the attention layer configured to generate an output of the attention layer at least in part by applying an attention mechanism over the sequence of convolutional features of the image and the set of object queries.

7. The method of claim 2, wherein the text detection neural network comprises one or more convolutional layers and one or more fully connected layers, the one or more convolutional layers configured to process the encoded representation of the image to generate a sequence of convolutional features of the encoded representation of the image, the one or more fully connecter layers configured to process the encoded representation of the set of object queries to generate a sequence of fully connected features of the encoded representation of the set of object queries.

8. The method of claim 7, wherein generating the text detection network output comprises: determining a combination of the sequence of convolutional features of the encoded representation of the image and the sequence of fully connected features of the encoded representation of the set of object queries.

9. The method of claim 2, wherein the layout analysis neural network comprises one or more attention layers configured to generate a sequence of layout features by applying an attention mechanism over the encoded representation of the set of object queries.

10. The method of claim 1, further comprising processing the image and, the text detection output or the layout detection output or both using optical character recognition (OCR) to obtain OCR text corresponding to text depicted in the image.

11. The method of claim 2, further comprising training the unified detector neural network on both a text detection task and a layout analysis task end-to-end to determine trained parameter values of unified detector neural network, wherein the training comprises performing a bipartite matching between training network outputs and ground truth outputs.

12. The method of claim 11, wherein performing the bipartite matching comprises:
determining a set of optimal assignments between the training network outputs and the ground truth outputs that maximizes a score determined by evaluating a function that includes a recognition quality term and a segmentation quality term.

13. A system comprising one or more computers and one or more storage devices storing instructions that when executed by the one or more computers cause the one or more computers to perform operations comprising:
generating a set of text detection masks for an image, wherein each text detection mask identifies a respective area of the image that likely includes a text item;
generating one or more layout relevance measures for the image, wherein each layout relevance measure is for a unique combination of two text detection masks in the set of text detection masks that specifies, for the two detection masks, a measure of relevance between text items identified by the two text detection masks;
generating respective textness scores for the text detection masks, wherein each respective textness score represents a likelihood that a text item is present in the respective area of the image identified by a corresponding text detection mask;
generating a text detection output that defines respective areas of the image that are determined to include text items, the text detection output being a selection of a proper subset of the set of text detection masks based on the respective textness scores; and
generating, from the proper subset of the set of text detection masks and the one or more layout relevance measures, a layout analysis output that defines clusters of respective areas of the image identified by the text detection masks in the proper subset of the set of text detection masks.

14. The system of claim 13, wherein:
generating the set of text detection masks for the image comprises:
processing the image and a set of object queries using a backbone neural network according to current parameter values of the backbone neural network to generate an encoded representation of the image and an encoded representation of the set of object queries; and
processing the encoded representation of the image and the encoded representation of the set of object queries using a text detection neural network according to current parameter values of the text detection neural network to generate the set of text detection masks, wherein each text detection mask identifies a respective area of the image that likely includes a text item;

generating the one or more layout relevance measures for the image comprises:
processing the encoded representation of the set of object queries using a layout analysis neural network according to current parameter values of the layout analysis neural network to generate the one or more layout relevance measures;

generating the respective textness scores for the text detection masks comprises:
processing the encoded representation of the set of object queries using a textness neural network according to current parameter values of the textness neural network to generate the respective textness scores for the text detection masks; and the backbone neural network, the text detection neural network, the layout analysis neural network, and the textness neural network define a unified detector neural network.

15. The system of claim 13, wherein selecting the proper subset of the set of text detection masks comprises:
selecting, from the set of text detection masks, one or more text detection masks that have highest textness scores.

16. The system of claim 13, wherein selecting the proper subset of the set of text detection masks comprises:
selecting, from the set of text detection masks, one or more text detection masks that have at least a threshold textness score.

17. The system of claim 13, wherein generating the layout detection output comprises:
generating one or more clusters of the text items included in the respective areas of the image identified by the text detection masks in the proper subset of text detection masks, wherein each cluster includes a group of text items, each pair of text items in the group having a pairwise measure of relevance that is above a threshold measure.

18. The system of claim 13, wherein the operations further comprise processing the image and, the text detection output or the layout detection output or both using optical character recognition (OCR) to obtain OCR text corresponding to text depicted in the image.

19. One or more computer storage media storing instructions that when executed by one or more computers cause the one or more computers to perform operations comprising:
generating a set of text detection masks for an image, wherein each text detection mask identifies a respective area of the image that likely includes a text item;
generating one or more layout relevance measures for the image, wherein each layout relevance measure is for a unique combination of two text detection masks in the set of text detection masks that specifies, for the two detection masks, a measure of relevance between text items identified by the two text detection masks;
generating respective textness scores for the text detection masks, wherein each respective textness score represents a likelihood that a text item is present in the respective area of the image identified by a corresponding text detection mask;
generating a text detection output that defines respective areas of the image that are determined to include text items, the text detection output being a selection of a proper subset of the set of text detection masks based on the respective textness scores; and
generating, from the proper subset of the set of text detection masks and the one or more layout relevance measures, a layout analysis output that defines clusters of respective areas of the image identified by the text detection masks in the proper subset of the set of text detection masks.

20. The computer storage media of claim 19, wherein:
generating the set of text detection masks for the image comprises:
processing the image and a set of object queries using a backbone neural network according to current parameter values of the backbone neural network to generate an encoded representation of the image and an encoded representation of the set of object queries; and
processing the encoded representation of the image and the encoded representation of the set of object queries using a text detection neural network according to current parameter values of the text detection neural network to generate the set of text detection masks, wherein each text detection mask identifies a respective area of the image that likely includes a text item;

generating the one or more layout relevance measures for the image comprises:
processing the encoded representation of the set of object queries using a layout analysis neural network according to current parameter values of the layout analysis neural network to generate the one or more layout relevance measures;

generating the respective textness scores for the text detection masks comprises:
processing the encoded representation of the set of object queries using a textness neural network according to current parameter values of the textness neural network to generate the respective textness scores for the text detection masks; and the backbone neural network, the text detection neural network, the layout analysis neural network, and the textness neural network define a unified detector neural network.

* * * * *